US012658203B2

(12) United States Patent
Hoshi et al.

(10) Patent No.: US 12,658,203 B2
(45) Date of Patent: Jun. 16, 2026

(54) DISK DEVICE AND HEAD GIMBAL ASSEMBLY HAVING A LOAD BEAM WITH A VARYING RAIL CONFIGURATION

(71) Applicants: Kabushiki Kaisha Toshiba, Tokyo (JP); Toshiba Electronic Devices & Storage Corporation, Tokyo (JP)

(72) Inventors: Ryogo Hoshi, Yokohama Kanagawa (JP); Kenichiro Aoki, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/917,888

(22) Filed: Oct. 16, 2024

(65) Prior Publication Data

US 2025/0364007 A1     Nov. 27, 2025

(30) Foreign Application Priority Data

May 21, 2024     (JP) ................................. 2024-082341

(51) Int. Cl.
    *G11B 5/48*          (2006.01)
(52) U.S. Cl.
    CPC .......... *G11B 5/4826* (2013.01); *G11B 5/4833* (2013.01)
(58) Field of Classification Search
    None
    See application file for complete search history.

(56)          References Cited

U.S. PATENT DOCUMENTS

| | | | | |
|---|---|---|---|---|
| 7,724,476 B1* | 5/2010 | Bjorstrom et al. .. | G11B 5/4833 | |
| | | | | 360/244.2 |
| 7,952,836 B1 | 5/2011 | Berscheit et al. | | |
| 8,203,807 B2 | 6/2012 | Takasugi et al. | | |
| 9,129,618 B1* | 9/2015 | Tsuchida et al. .... | G11B 5/4833 | |
| 10,163,457 B2 | 12/2018 | Aoki et al. | | |
| 11,037,589 B1* | 6/2021 | Deokar et al. ....... | G11B 5/4826 | |
| 2003/0086207 A1 | 5/2003 | Watadani et al. | | |
| 2009/0154022 A1* | 6/2009 | Takikawa ............. | G11B 5/4833 | |
| | | | | 360/245.7 |
| 2009/0279209 A1* | 11/2009 | Fujimoto et al. .... | G11B 5/4826 | |
| | | | | 360/234.6 |
| 2012/0106005 A1* | 5/2012 | Fujimoto ............. | G11B 5/4833 | |
| | | | | 360/234.6 |
| 2012/0250191 A1* | 10/2012 | Fujimoto ............. | G11B 5/4833 | |
| | | | | 360/244.2 |

(Continued)

FOREIGN PATENT DOCUMENTS

JP          5296174 B2      9/2013

*Primary Examiner* — Craig A. Renner
(74) *Attorney, Agent, or Firm* — Kim & Stewart LLP

(57)          ABSTRACT

According to one embodiment, a head gimbal assembly (HGA) of a disk device includes a load beam. The load beam includes two side rails, a plate between the two side rails, a first plane of the plate, a lift tab protruding from an end of the plate, and a protrusion protruding from the first plane and supporting a slider. An edge of each of the two side rails has a first edge, a second edge extending from the first edge toward the lift tab, and a third edge extending from the second edge to the lift tab while being inclined with respect to the first plane so as to approach the first plane. An end of the slider is at the same position as an end of the third edge or is farther from the lift tab than the end of the third edge.

9 Claims, 7 Drawing Sheets

(56) References Cited

U.S. PATENT DOCUMENTS

2021/0383829 A1* 12/2021 Kurebayashi et al. ...................... G11B 5/4833
2023/0326483 A1* 10/2023 Zhang et al. ........ G11B 5/4833
360/245.3

* cited by examiner

DISK DEVICE AND HEAD GIMBAL ASSEMBLY HAVING A LOAD BEAM WITH A VARYING RAIL CONFIGURATION

CROSS-REFERENCE TO RELATED APPLICATIONS

This application is based upon and claims the benefit of priority from Japanese Patent Application No. 2024-082341, filed on May 21, 2024; the entire contents of which are incorporated herein by reference.

FIELD

Embodiments described herein relate generally to a disk device and a head gimbal assembly.

BACKGROUND

A disk device such as a hard disk drive (HDD) includes, for example, a plurality of magnetic disks, a plurality of head gimbal assemblies (HGAs), and a ramp. The HGAs move between a load position and an unload position. While the HGAs are located at the load position, a slider of the each HGA is located on a surface of corresponding one of the magnetic disks. While the HGAs are placed at the unload position, the HGAs are held by the ramp.

A load beam of the HGA includes a lift tab positioned at a tip of the load beam and side rails that increase a rigidity of the load beam. While the HGAs are located the unload position, the rump supports the lift tabs to bend the load beams. The bent load beams are each inclined such that the lift tabs of two adjacent HGAs are close to each other. Due to the inclination of the load beam, the side rails of the two HGAs may interfere with each other in the vicinity of the lift tabs. On the other hand, when the width of the side rail is shortened, the rigidity of the load beam may decrease.

DETAILED DESCRIPTION

Figure 1:
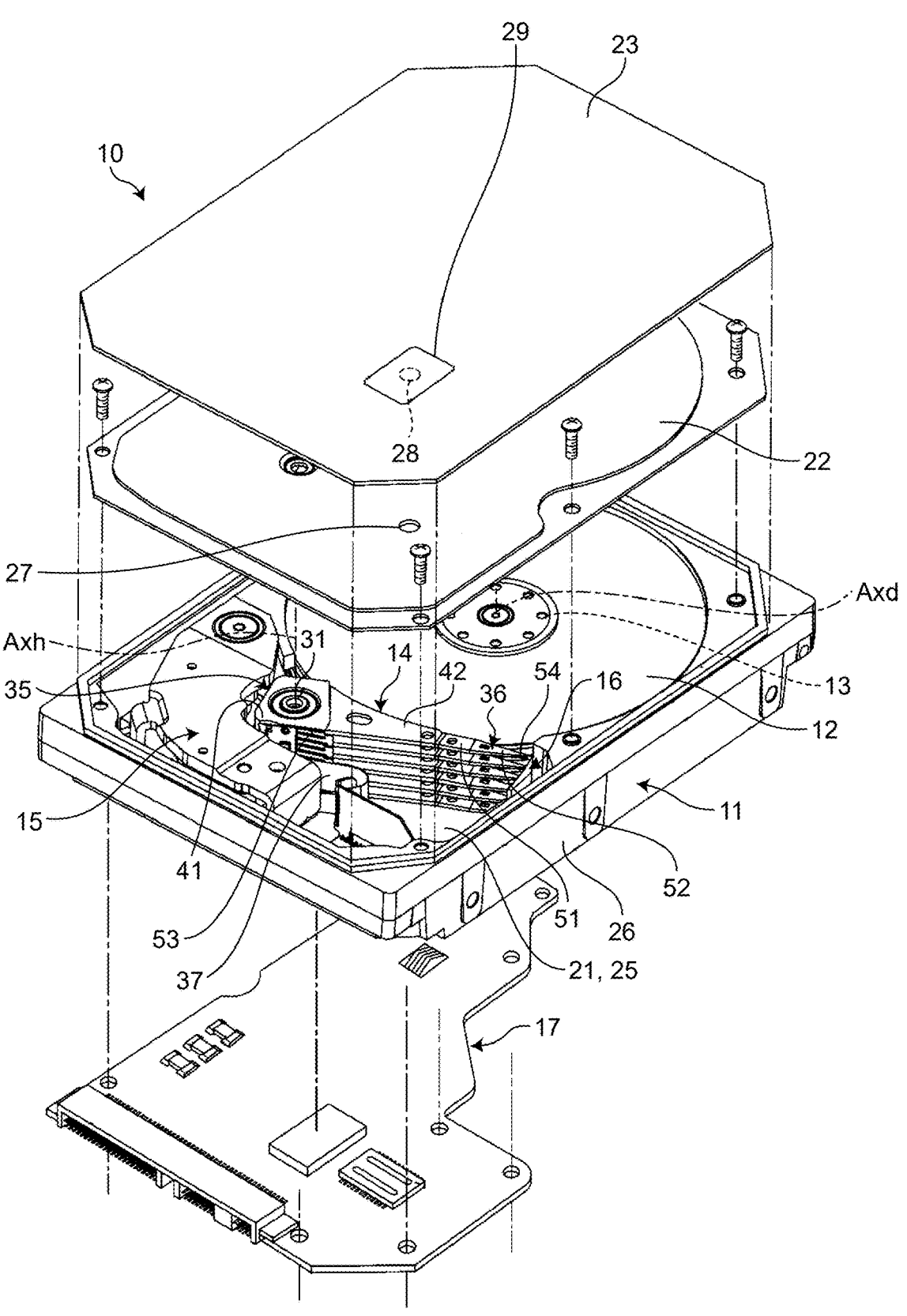
FIG. 1 is an exemplary exploded perspective view illustrating an HDD according to a first embodiment.

According to one embodiment, a disk device includes a plurality of magnetic disks, a ramp, and a plurality of head gimbal assemblies. Each of the plurality of head gimbal assemblies includes a slider configured to read and write information from and to one of the plurality of magnetic disks and a load beam supporting the slider, and is movable between a load position where the slider is disposed on the one of the plurality of magnetic disks, and an unload position where the load beam is supported by the ramp. The load beam includes two side rails, a plate provided between the two side rails, a first plane of the plate, a lift tab protruding from an end of the plate in a first direction along the first plane, a second plane of the plate connected to an end of the first plane in a second direction opposite to the first direction and inclined with respect to the first plane, and a protrusion protruding from the first plane and supporting the slider. The first plane is configured to face the one of the plurality of magnetic disks while the plurality of head gimbal assemblies are located at the load position. The lift tab is configured to be supported by the ramp while the plurality of head gimbal assemblies are located at the unload position. An edge of each of the two side rails in a third direction in which the first plane faces, is connected to the plate. An edge of each of the two side rails in a fourth direction opposite to the third direction has a first edge farther from the lift tab than the first plane, a second edge extending from the first edge toward the lift tab, and a third edge extending from the second edge to the lift tab and inclined with respect to the first plane so as to approach the first plane. The second edge extends to the third edge while being parallel to or inclined with respect to the first plane so as to be approach the first plane. In the second direction, an end of the slider is at the same position as an end of the third edge or farther from the lift tab than an end of the third edge.

First Embodiment

Hereinafter, a first embodiment will be described with reference to FIGS. 1 to 6. Note that, in the present specification, components according to embodiments and description of the components may be described in a plurality of expressions. The components and the descriptions thereof are examples, and are not limited by the expression of the present specification. The components may also be identified with names different from those herein. In addition, the components may be described by an expression different from the expression in the present specification.

In the description below, "suppress" is defined as, for example, preventing occurrence of an event, an action, or an influence, or reducing a degree of the event, the action, or the influence. Furthermore, in the following description, "restrict" is defined as, for example, preventing movement or rotation, or allowing movement or rotation within a predetermined range and preventing movement or rotation beyond the predetermined range.

FIG. 1 is an exemplary exploded perspective view illustrating a hard disk drive (HDD) 10 according to a first embodiment. The HDD 10 is an example of a disk device, and may also be referred to as an electronic device, a memory device, an external memory device, or a magnetic disk device.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. Note that the HDD 10 is not limited to this example. The ramp load mechanism 16 is an example of a ramp.

The housing 11 accommodates the magnetic disks 12, the spindle motor 13, the HSA 14, the VCM 15, and the ramp load mechanism 16. The housing 11 includes a base 21, an inner cover 22, and an outer cover 23.

The base 21 is formed in a substantially rectangular parallelepiped box shape opened in one direction. The base 21 has a bottom wall 25 and a side wall 26. The bottom wall 25 is formed in a substantially rectangular (quadrangular) plate shape. The side wall 26 protrudes from an edge of the bottom wall 25 and is formed in a substantially rectangular frame shape.

The inner cover 22 is attached to an end of the side wall 26 with, for example, a screw to close a space inside the base 21. The outer cover 23 covers the inner cover 22 and is attached to the end of the side wall 26 by, for example, welding. A vent 27 is provided in the inner cover 22. Furthermore, a vent 28 is provided in the outer cover 23.

After the components are attached to the inside of the base 21 and the inner cover 22 and the outer cover 23 are attached to the base 21, air inside the housing 11 is removed from ventilation ports 27 and 28. Furthermore, the housing 11 is filled with a gas different from the air.

The gas filled in the housing 11 is, for example, a low density gas having a density lower than that of air, an inert gas having low reactivity, or the like. For example, helium is filled inside the housing 11. The inside of the housing 11 may be filled with another fluid.

The vent 28 of the outer cover 23 is closed by a seal 29. The seal 29 hermetically seals the vent 28 and restricts the fluid filled inside the housing 11 from leaking out through the vent 28.

The plurality of magnetic disks 12 is formed in a substantially disk shape. A magnetic recording layer is provided on at least one of an upper surface and a lower surface of the magnetic disk 12. The plurality of magnetic disks 12 is stacked at intervals. The HDD 10 according to the present embodiment includes, for example, 12 magnetic disks 12. Note that the number of magnetic disks 12 is not limited to this example.

The spindle motor 13 supports the plurality of magnetic disks 12. The spindle motor 13 rotates the plurality of magnetic disks 12 about a central axis Axd of the spindle motor 13. The plurality of magnetic disks 12 is held by a hub of the spindle motor 13 by, for example, a clamp spring.

The HSA 14 is rotatably supported by a support shaft 31. The support shaft 31 is provided at a position separated from the magnetic disk 12 in a direction orthogonal to the central axis Axd. The support shaft 31 protrudes from the bottom wall 25 of the housing 11.

The HSA 14 can rotate about a central axis Axh. The central axis Axh is a virtual axis extending substantially parallel to the central axis Axd of the magnetic disk 12. The central axis Axh is, for example, a center of rotation of the HSA 14 and also a central axis of the support shaft 31.

The HSA 14 has a carriage 35, a plurality of head gimbal assemblies (HGA) 36, and a flexible printed circuit board (FPC) 37. The carriage 35 includes an actuator block 41 and a plurality of arms 42.

Figure 2:
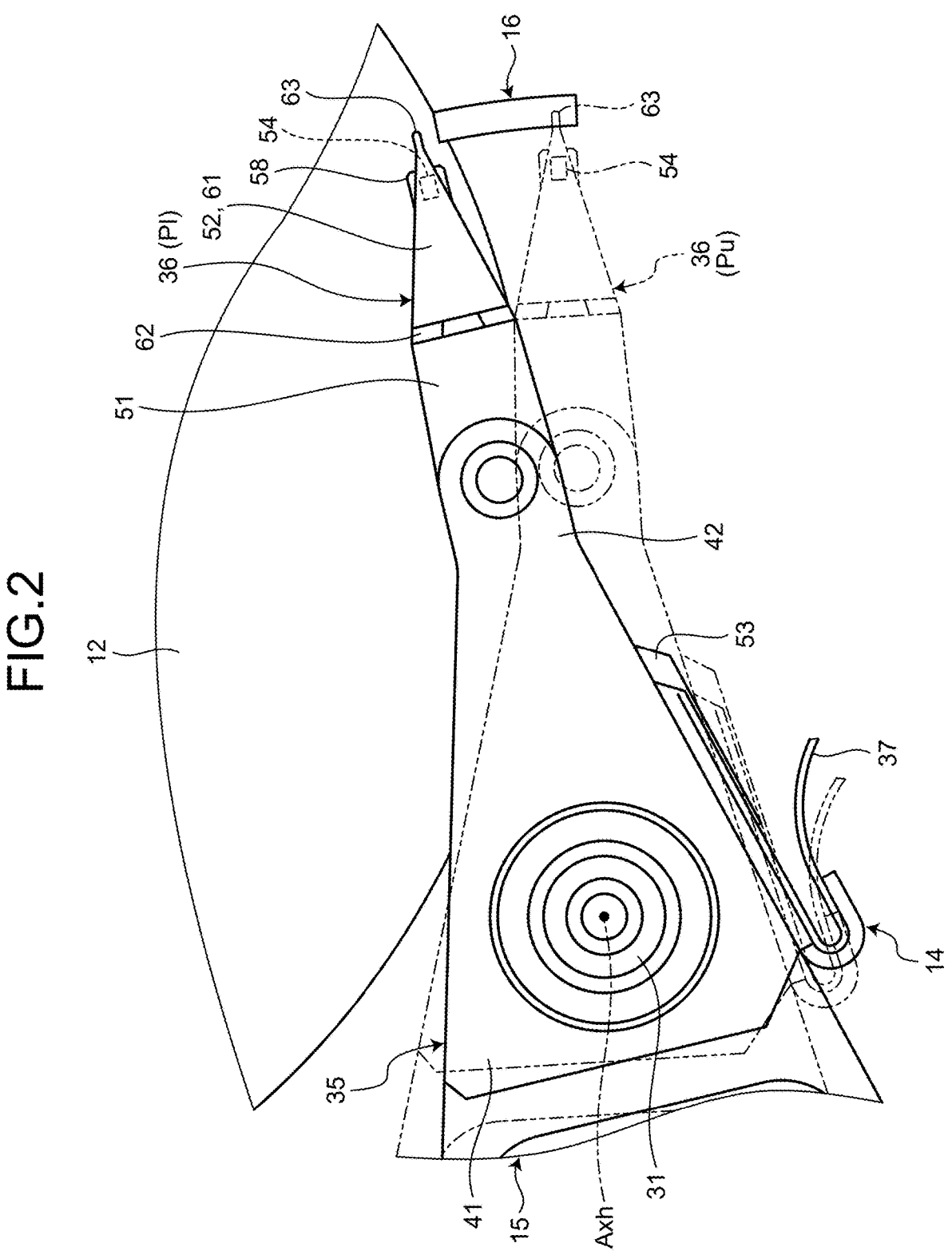
FIG. 2 is an exemplary plan view schematically illustrating a magnetic disk, an HSA, and a ramp load mechanism of the first embodiment.

FIG. 2 is an exemplary plan view schematically illustrating the magnetic disk 12, the HSA 14, and the ramp load mechanism 16 of the first embodiment. As illustrated in FIG. 2, for example, the actuator block 41 is rotatably supported by the support shaft 31 via a bearing. The plurality of arms 42 protrudes from the actuator block 41 in a direction orthogonal to the central axis Axh. The carriage 35 may be divided, and the arm 42 may protrude from each of the plurality of actuator blocks 41.

The plurality of arms 42 extends substantially in parallel and is arranged at intervals along the central axis Axh. Each of the arms 42 is formed in a plate shape capable of entering a gap between two adjacent magnetic disks 12 of the plurality of magnetic disks 12.

A voice coil of the VCM 15 is attached to the actuator block 41. The support shaft 31 is located between the arm 42 and the voice coil. The VCM 15 includes the voice coil, a pair of yokes, and a magnet provided on the yoke.

Each of the plurality of HGAs 36 is attached to a corresponding one of the plurality of arms 42. As a result, the plurality of HGAs 36 is arranged at intervals along the central axis Axh. Two HGAs 36 are attached to one arm 42.

Each of the plurality of HGAs 36 includes a base plate 51, a load beam 52, a flexure 53, a slider 54, and two micro actuators (MA) 55. The slider 54 may also be referred to as a head slider or a magnetic head.

The base plate 51 and the load beam 52 are made of, for example, stainless steel. Note that the base plate 51 and the load beam 52 may be made of other materials such as an aluminum alloy.

The base plate 51 is formed in, for example, a substantially rectangular plate shape. For example, the base plate 51 is attached to a tip of the arm 42 by caulking. The load beam 52 is formed in a plate shape thinner than the base plate 51. The load beam 52 is attached to the base plate 51 so as to protrude from the base plate 51.

The flexure 53 is a kind of flexible printed wiring board formed in a long belt shape. The flexure 53 includes, for example, a metal backing layer, an insulating base layer, a conductive layer, and a cover layer of an insulating layer.

A gimbal 58 of the flexure 53 is provided at a tip of the HGA 36. The slider 54 is mounted on the gimbal 58. The gimbal 58 is attached to the load beam 52 such that a portion of the gimbal 58 on which the slider 54 is mounted is rotatable.

MA 55 is, for example, a piezoelectric element. The MA 55 is mounted on the gimbal 58. Two MAs 55 expand and contract when a voltage is applied, and rotate a portion of the gimbal 58 on which the slider 54 is mounted.

The FPC 37 is formed in, for example, a belt shape. As illustrated in FIG. 1, one end of the FPC 37 is attached to the actuator block 41 and connected to the flexures 53 of the plurality of HGAs 36. The other end of the FPC 37 is attached to the bottom wall 25 of the base 21. The FPC 37 is elastically bent between both ends according to the rotation of the HSA 14.

The VCM 15 rotates the carriage 35 about the central axis Axh. As illustrated in FIG. 2, the VCM 15 rotates the carriage 35 to move the plurality of HGAs 36 between a load position Pl and an unload position Pu.

At the load position Pl, each of the plurality of sliders 54 is arranged on a corresponding one of the plurality of magnetic disks 12. The slider 54 floats from the magnetic disk 12 by airflow generated by the rotation of the magnetic disk 12.

At the load position Pl, the slider 54 records and reproduces information to and from the magnetic recording layer of the magnetic disk 12. In other words, the slider 54 reads and writes information from and to the magnetic disk 12.

At the unload position Pu, the slider 54 is farther from the central axis Axd than the outermost periphery of the magnetic disk 12, and the ramp load mechanism 16 supports the load beam 52. The slider 54 at the unload position Pu is farther from the magnetic disk 12 along the central axis Axd than the slider 54 at the load position Pl.

The PCB 17 in FIG. 1 is, for example, a rigid board such as a glass epoxy board, a multilayer board, and a build-up board. The PCB 17 is disposed outside the housing 11 and is attached to the bottom wall 25 of the base 21.

Various electronic components such as a relay connector connected to the FPC 37, an interface (I/F) connector connected to the host computer, and a controller that controls the operation of the HDD 10 are mounted on the PCB 17. The relay connector is electrically connected to the FPC 37 via, for example, a connector provided on the bottom wall 25.

The PCB 17 is electrically connected to the slider 54 and the MA 55 through the FPC 37 and the flexure 53. A controller on the PCB 17 controls the slider 54 to read and write information from and to the magnetic disk 12.

Figure 3:
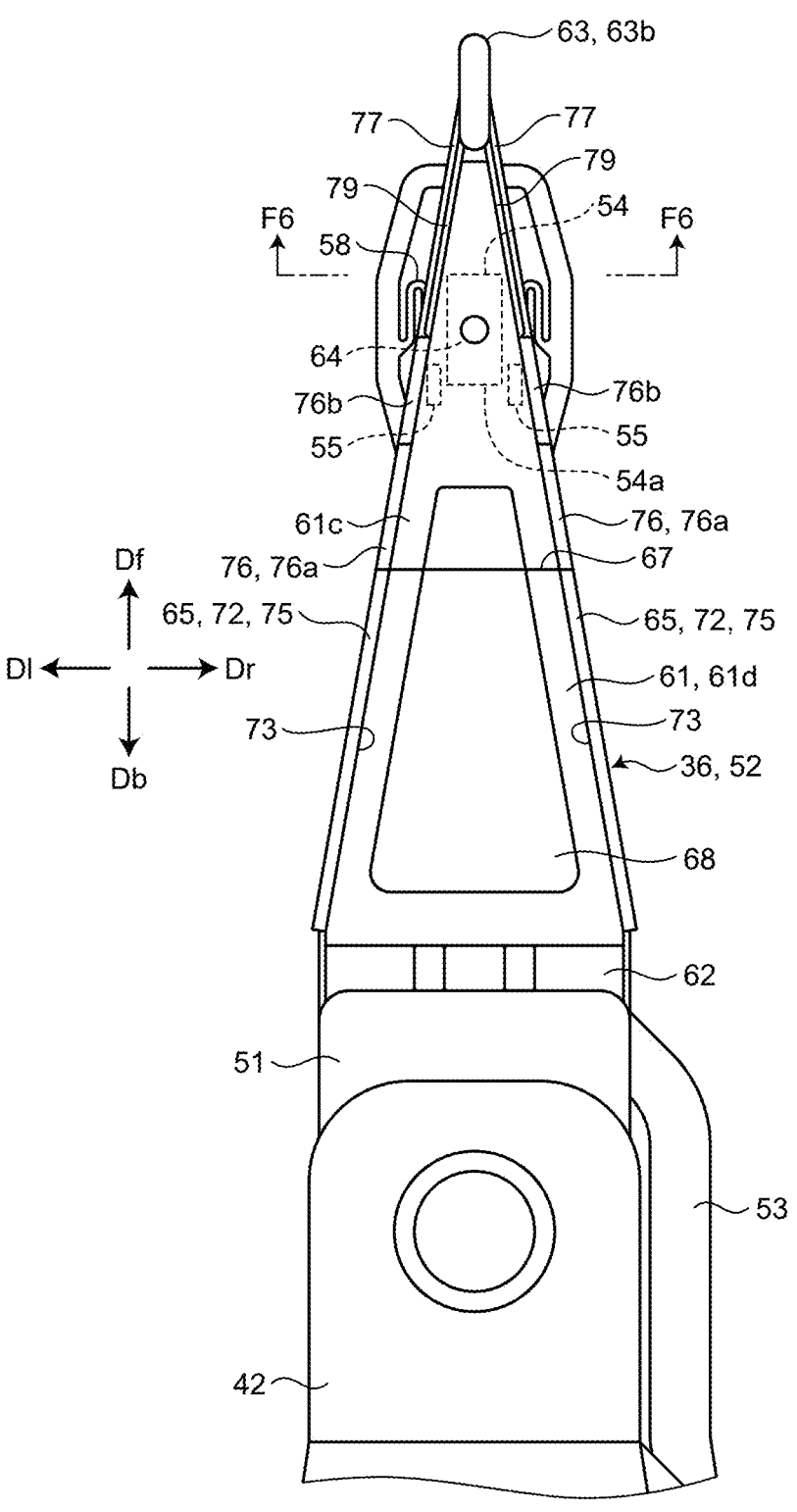
FIG. 3 is an exemplary plan view illustrating an HGA and an arm of the first embodiment.

FIG. 3 is an exemplary plan view illustrating the HGA 36 and the arm 42 of the first embodiment. The load beam 52 is formed by, for example, pressing or bending. As illustrated in FIG. 3, the load beam 52 includes a plate 61, a leaf spring 62, a lift tab 63, a protrusion 64, and two side rails 65. The protrusion 64 may also be referred to as a dimple.

Figure 4:
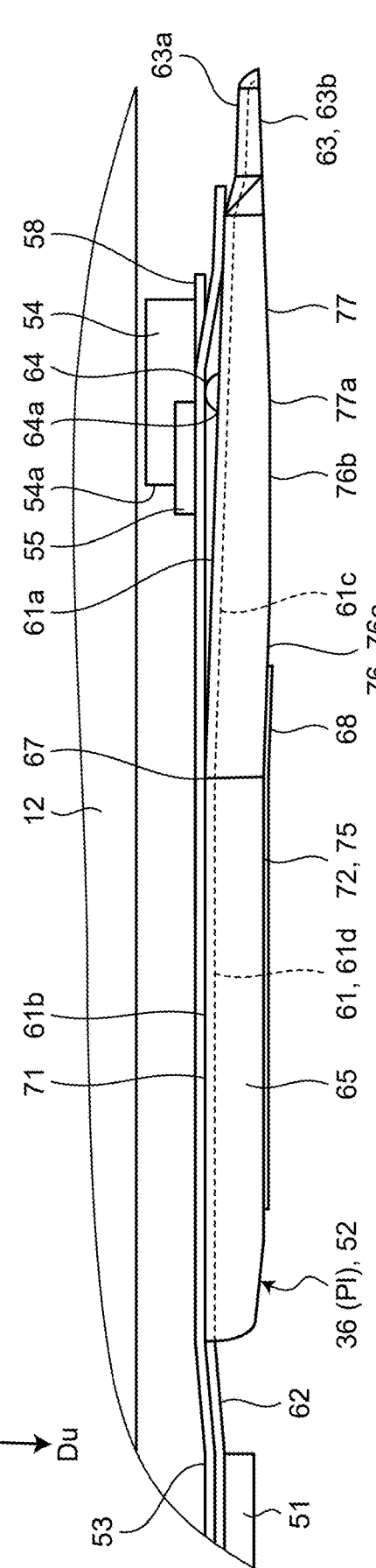
FIG. 4 is an exemplary side view illustrating the magnetic disk and the HGA at a load position of the first embodiment.

FIG. 4 is an exemplary side view illustrating the magnetic disk 12 and the HGA 36 at the load position Pl of the first embodiment. As illustrated in FIG. 4, the plate 61 is formed in a plate shape bent at the bent portion 67. The plate 61 has a first plane 61a, a second plane 61b, a third plane 61c, and a fourth plane 61d.

At the load position Pl, the first plane 61a and the second plane 61b face a corresponding one of the plurality of magnetic disks 12. A bent portion 67 is provided between the first plane 61a and the second plane 61b. In other words, the first plane 61a and the second plane 61b are one surface bent at the bent portion 67.

As illustrated in the drawings, in the present specification, a forward direction Df, a backward direction Db, a left direction Dl, a right direction Dr, a downward direction Dd, and an upward direction Du are defined for convenience. Note that the names of the forward direction Df, the backward direction Db, the left direction Dl, the right direction Dr, the downward direction Dd, and the upward direction Du are names for convenience, and do not limit the direction, position, and use mode of the HGA 36. The forward direction Df is an example of a first direction. The backward direction Db is an example of a second direction. The downward direction Dd is an example of a third direction. The upward direction Du is an example of a fourth direction.

The forward direction Df, the backward direction Db, the left direction Dl, and the right direction Dr are directions along the first plane 61a. The forward direction Df and the backward direction Db are approximately equal to a longitudinal direction of the load beam 52. The HGA 36 extends from the arm 42 in approximately the forward direction Df, and the load beam 52 extends from the base plate 51 in approximately the forward direction Df. The backward direction Db is a direction opposite to the forward direction Df. The left direction Dl and the right direction Dr are directions orthogonal to the forward direction Df and the backward direction Db.

The downward direction Dd and the upward direction Du are directions orthogonal to the first plane 61a. The downward direction Dd is a direction in which the first plane 61a faces. In other words, the magnetic disk 12 is spaced apart from the first plane 61a in the downward direction Dd at the load position Pl. The upward direction Du is a direction opposite to the downward direction Dd.

The forward direction Df, the backward direction Db, the downward direction Dd, and the upward direction Du for each of the plurality of HGAs 36 are different from each other. Furthermore, for example, the forward direction Df, the backward direction Db, the left direction Dl, the right direction Dr, the downward direction Dd, and the upward direction Du change by movement and deformation of the HGA 36.

The second plane 61b is connected to an end of the first plane 61a in the backward direction Db. The bent portion 67 extends in the left direction Dl and the right direction Dr between the first plane 61a and the second plane 61b. The second plane 61b is inclined with respect to the first plane 61a around the bent portion 67. Therefore, a direction in which the second plane 61b faces is inclined with respect to the downward direction Dd.

The third plane 61c is located on the opposite side of the first plane 61a. The third plane 61c faces in the upward direction Du. The fourth plane 61d is located on the opposite side of the second plane 61b. The bent portion 67 is located between the third plane 61c and the fourth plane 61d.

As illustrated in FIG. 3, a damper 68 may be attached to the third plane 61c and the fourth plane 61d. The damper 68 includes, for example, a constraint layer and a viscoelastic body. The viscoelastic body is located between the constraint layer and the third plane 61c and between the constraint layer and the fourth plane 61d. As a result, the damper 68 attenuates vibration of the HGA 36.

The leaf spring 62 protrudes from an end of the plate 61 in the backward direction Db and is attached to the base plate 51. The leaf spring 62 is elastically deformed between the base plate 51 and the plate 61. At the load position Pl, the leaf spring 62 pushes the slider 54 toward the magnetic disk 12 by an elastic force.

The plate 61 extends from the leaf spring 62 so as to be tapered approximately in the forward direction Df. For example, the first plane 61a and the third plane 61c are formed in a substantially triangular shape or a substantially trapezoidal shape tapered in the forward direction Df. The second plane 61b and the fourth plane 61d are formed in a substantially trapezoidal shape tapered in the forward direction Df. Note that the shape of the plate 61 is not limited to this example.

The lift tab 63 protrudes substantially in the forward direction Df from the end of the plate 61 in the forward direction Df. In other words, the plate 61 is located between the leaf spring 62 and the lift tab 63. The lift tab 63 is located at the tip of the HGA 36. In other words, the lift tab 63 is provided at the end of the HGA 36 in the forward direction Df.

As illustrated in FIG. 4, the lift tab 63 has a bottom surface 63a and an edge 63b. The bottom surface 63a is a substantially boat shaped curved surface. At the load position Pl, the bottom surface 63a faces the magnetic disk 12 as a whole. The bottom surface 63a is connected to the first plane 61a of the plate 61. The edge 63b is an edge of the lift tab 63 in the upward direction Du.

Figure 5:
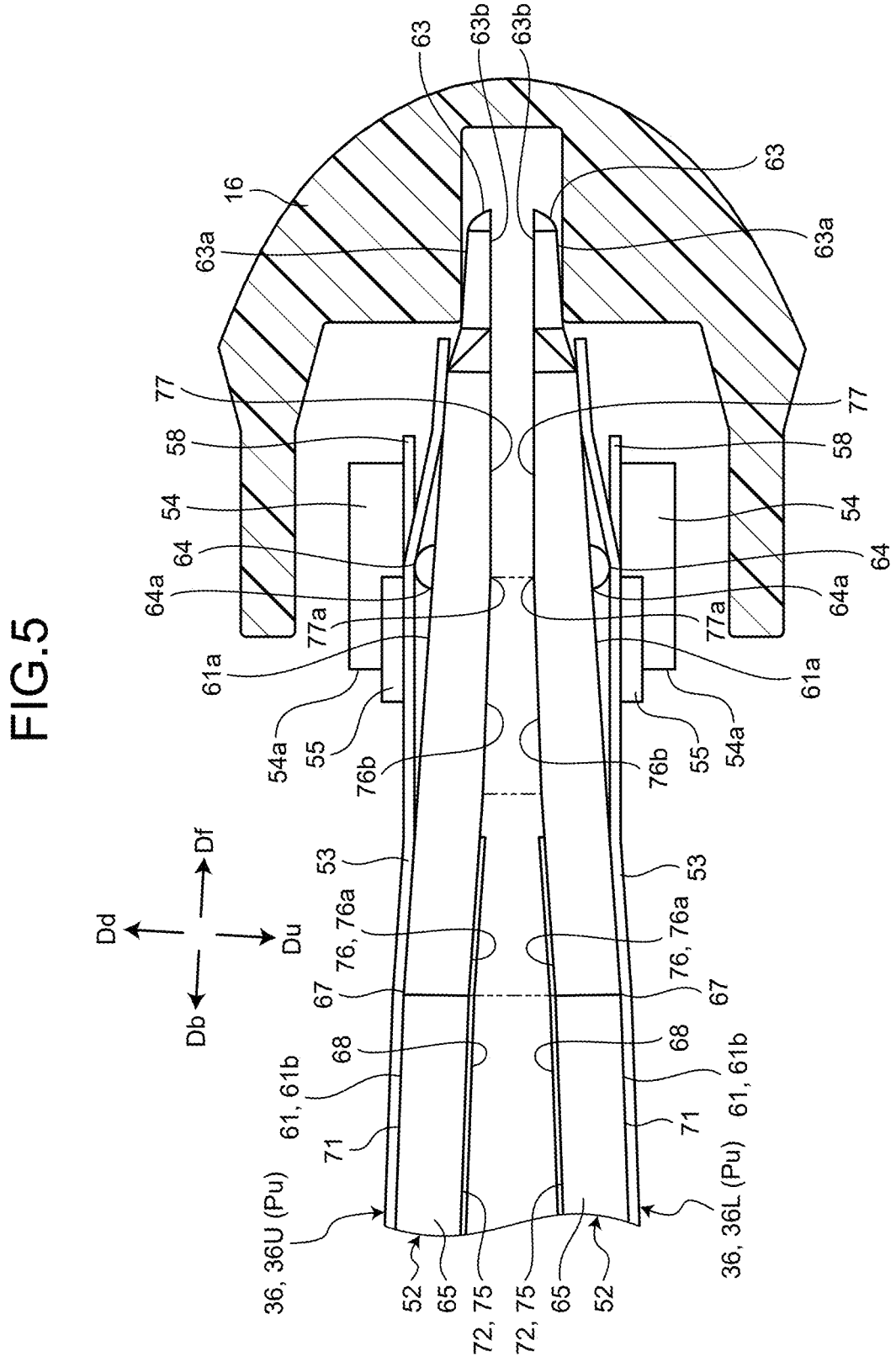
FIG. 5 is an exemplary side view illustrating the ramp load mechanism and the HGA at an unload position of the first embodiment.

FIG. 5 is an exemplary side view illustrating the ramp load mechanism 16 and the HGA 36 at the unload position Pu of the first embodiment. As illustrated in FIG. 5, at the unload position Pu, the bottom surface 63a of the lift tab 63 is supported by the ramp load mechanism 16.

The protrusion 64 protrudes from the first plane 61a. The protrusion 64 is formed in, for example, a substantially hemispherical shape. Note that the shape of the protrusion 64 is not limited to this example. The protrusion 64 of the load beam 52 rotatably supports the slider 54 via the flexure 53 or directly. Therefore, the slider 54 can rotate around the protrusion 64 together with the gimbal 58.

Figure 6:
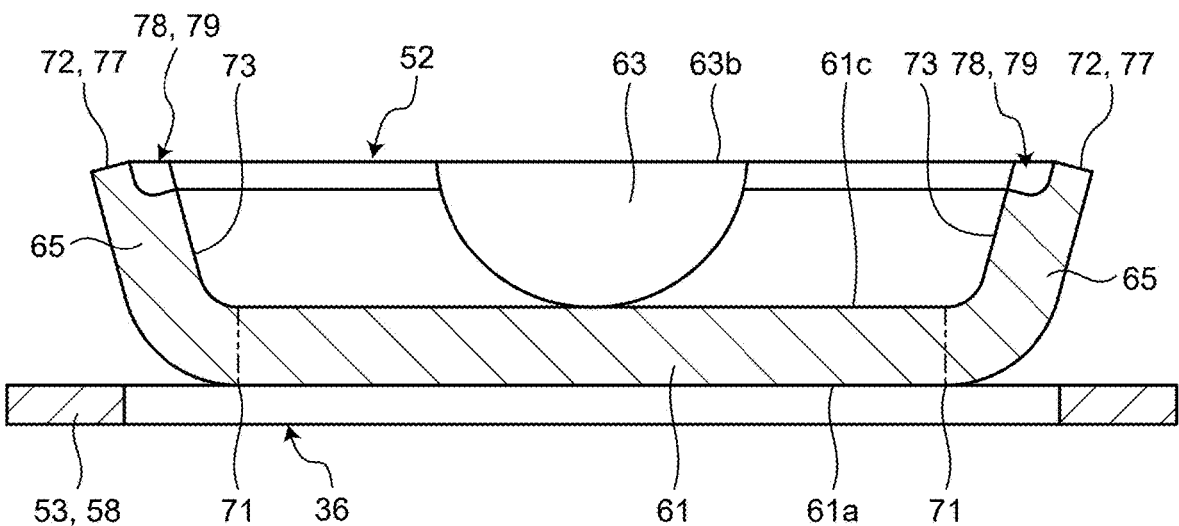
FIG. 6 is an exemplary cross-sectional view illustrating the HGA of the first embodiment taken along line F6-F6 in FIG. 3.
Figure 6:
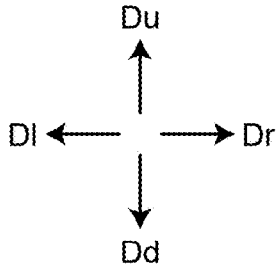

FIG. 6 is an exemplary cross-sectional view illustrating the HGA 36 of the first embodiment taken along line F6-F6 in FIG. 3. As illustrated in FIG. 6, the two side rails 65 extend approximately in the upward direction Du from the ends of the plate 61 in the left direction Dl and the right direction Dr. In other words, the side rail 65 extends from the ends of the third plane 61c and the fourth plane 61d of the plate 61 in the left direction Dl and the right direction Dr. Therefore, the plate 61 is provided between the two side rails 65.

As illustrated in FIG. 3, the side rail 65 extends from the vicinity of the leaf spring 62 to the lift tab 63. Therefore, a distance between the two side rails 65 decreases in the forward direction Df. As illustrated in FIG. 6, each of the two side rails 65 has a lower edge 71, an upper edge 72, and a side surface 73.

The lower edge 71 is an edge of the side rail 65 in the downward direction Dd. The lower edge 71 is connected to the plate 61. The upper edge 72 is located on the opposite side of the lower edge 71. In other words, the upper edge 72 is an edge of the side rail 65 in the upward direction Du. The upper edge 72 may also be referred to as an end face. As illustrated in FIG. 5, the upper edge 72 has a first edge 75, a second edge 76, and a third edge 77.

The first edge 75 is a portion of the upper edge 72 that is farther from the lift tab 63 than the first plane 61a. In other words, the first edge 75 is a portion of the upper edge 72 that is farther from the lift tab 63 than the bent portion 67 in the longitudinal direction (the forward direction Df and the backward direction Db). In the longitudinal direction, an end of the first edge 75 in the forward direction Df is at substantially the same position as the bent portion 67 or is separated from the bent portion 67 in the backward direction Db.

As illustrated in FIG. 4, most portion of the first edge 75 extends substantially parallel to the second plane 61b. In other words, a distance between the lower edge 71 and the first edge 75 is approximately constant. The distance between the lower edge 71 and the first edge 75 may be shorter in the vicinity of an end of the side rail 65 in the backward direction Db than other portions. The first edge 75 is not limited to the above example.

As illustrated in FIG. 5, the second edge 76 extends from the first edge 75 toward the lift tab 63. In other words, the second edge 76 is directly connected to the first edge 75. In the present embodiment, the second edge 76 has, for example, a parallel edge 76a and an inclined edge 76b. FIG. 5 schematically illustrates a position of a boundary between the first edge 75, the parallel edge 76a, the inclined edge 76b, and the third edge 77 by a two-dot chain line.

The parallel edge 76a extends from the first edge 75, substantially parallel to the first plane 61a, toward the third edge 77. In other words, a distance between the lower edge 71 and the parallel edge 76a is substantially constant. The first edge 75 and the parallel edge 76a of the second edge 76 may be bent in the vicinity of the bent portion 67 by bending the plate 61 at the bent portion 67.

The inclined edge 76b extends from the parallel edge 76a to the third edge 77 while being inclined with respect to the first plane 61a so as to approach the first plane 61a. In other words, a distance between the lower edge 71 and the inclined edge 76b decreases in the forward direction Df.

The entire second edge 76 may be the parallel edge 76a. Still more, the entire second edge 76 may be the inclined edge 76b. The second edge 76 may have a plurality of inclined edges 76b inclined with respect to each other. The inclined edge 76b may be bent.

The second edge 76 as a whole extends to the third edge 77 substantially parallel to the first plane 61a or inclined with respect to the first plane 61a so as to approach the first plane 61a. In other words, a distance between the lower edge 71 and the second edge 76 does not decrease toward the backward direction Db.

The third edge 77 extends from the inclined edge 76b of the second edge 76 to the lift tab 63 while being inclined with respect to the first plane 61a so as to approach the first plane 61a. In other words, the third edge 77 is located between the second edge 76 and the lift tab 63 and is directly connected to the second edge 76 and the lift tab 63.

A distance between the lower edge 71 and the third edge 77 decreases in the forward direction Df. The shortest distance between the lower edge 71 and the third edge 77 is, for example, greater than half the distance between the lower edge 71 and the parallel edge 76a. Note that the distance between the lower edge 71 and the third edge 77 is not limited to this example.

An angle between the inclined edge 76b and the first plane 61a is smaller than the angle between the third edge 77 and the first plane 61a. Thus, the second edge 76 is inclined with respect to the third edge 77.

For example, the angle between the third edge 77 and the first plane 61a is approximately 3°. The angle between the inclined edge 76b and the first plane 61a is larger than 0° and smaller than 3°. Note that the third edge 77 and the inclined edge 76b are not limited to this example.

The second edge 76 has the parallel edge 76a substantially parallel to the first plane 61a and the inclined edge 76b slightly inclined with respect to the first plane 61a. Thus, an angle between the second edge 76 and the first plane 61a is smaller than the angle between the third edge 77 and the first plane 61a.

As described above, the upper edge 72 has a portion (the inclined edge 76b and the third edge 77) inclined with respect to the first plane 61a. An angle between the portion of the upper edge 72 and the first plane 61a increases in the forward direction Df.

The edge 63b of the lift tab 63 is continuous with the third edge 77. In other words, the edge 63b and the third edge 77 are disposed on the same plane at least at a boundary between the edge 63b and the third edge 77. The edge 63b is not limited to this example. The edge 63b may have irregularities or may be bent.

The third edge 77 is provided at an end of the side rail 65 in the forward direction Df, and is closer to the lift tab 63 than the second plane 61b. In the longitudinal direction (the forward direction Df and the backward direction Db), an end 54a of the slider 54 in the backward direction Db is farther from the lift tab 63 than an end 77a of the third edge 77 in the backward direction Db. In the longitudinal direction, the end 54a of the slider 54 may be located at the same position as the end 77a of the third edge 77.

In the present embodiment, in the longitudinal direction (the forward direction Df and the backward direction Db), an end 64a of the protrusion 64 in the backward direction Db is farther from the lift tab 63 than the end 77a of the third edge 77. In the longitudinal direction, the end 64a of the protrusion 64 may be located at the same position as the end 77a of the third edge 77.

As illustrated in FIG. 6, the side surface 73 is provided between the upper edge 72 and the plate 61. In other words, the side surface 73 extends between the first edge 75 and the fourth plane 61d, between the second edge 76 and the third plane 61c, and between the third edge 77 and the third plane 61c.

The side rail 65 in the present embodiment extends from the plate 61 so as to be inclined with respect to the first plane 61a. Therefore, a direction in which the side surface 73 faces is inclined with respect to the left direction Dl and the right direction Dr. A direction in which the upper edge 72 faces is inclined with respect to the upward direction Du. The upper edge 72 may be parallel to the first plane 61a so as to face the upward direction Du.

Since the side rail 65 is inclined, a corner 78 between the third edge 77 and the side surface 73 is located at an end of the third edge 77 in the upward direction Du. The corner 78 is provided with a recess 79. Therefore, the recess 79 is opened on the third edge 77 and the side surface 73.

For example, before the load beam 52 is formed by pressing or bending, the side surface 73 is a surface of the sheet metal that is the material of the load beam 52. The upper edge 72 is an edge of the sheet metal. The surface (side surface 73) of the sheet metal is partially scraped (melted) by, for example, partial etching to form the recess 79. After the recess 79 is formed, the sheet metal is bent by pressing or bending to form the load beam 52. The method of forming the recess 79 is not limited to this example.

In the present embodiment, the recess 79 is not provided on the first edge 75 and the second edge 76. In other words, the first edge 75 and the second edge 76 are directly connected to the side surface 73. Note that the recess 79 may be provided in at least one of the first edge 75 and the second edge 76.

As illustrated in FIG. 5, the plurality of HGAs 36 includes two HGAs, HGAs 36U and 36L. The HGA 36U is one of the plurality of HGAs 36 and is an example of a first head gimbal assembly. The HGA 36L is another one of the plurality of HGAs 36 and is an example of a second head gimbal assembly.

The HGAs 36U and 36L are located between two adjacent magnetic disks 12. The two HGAs 36U and 36L are arranged substantially mirror-symmetrically and are adjacent to each other. FIG. 5 illustrates the forward direction Df, the backward direction Db, the upward direction Du, and the downward direction Dd of the HGA 36U, and omits the forward direction Df, the backward direction Db, the upward direction Du, and the downward direction Dd of the HGA 36L.

When the HGA 36 moves from the load position Pl toward the unload position Pu, the bottom surface 63a of the lift tab 63 abuts on a slope of the ramp load mechanism 16. As the HGA 36 moves, the lift tab 63 moves along the slope of the ramp load mechanism 16, and the slider 54 separates from the magnetic disk 12.

When the HGA 36 moves toward the unload position Pu, the slope the ramp load mechanism 16 lifts the lift tabs 63. Therefore, the two load beams 52 are bent around the leaf spring 62 so as to approach each other. In other words, the HGAs 36U and 36L are inclined such that a distance between the two load beams 52 decreases in the forward direction Df.

At the unload position Pu, the HGA 36U and the HGA 36L are closest to each other in the vicinity of the lift tab 63. For example, the two third edges 77 are closest to each other in the HGAs 36U and 36L. The two lift tabs 63 may be closest to each other in the HGAs 36U and 36L.

In the unload position Pu, the third edge 77 of the HGA 36U and the third edge 77 of the HGA 36L are arranged substantially parallel. In other words, in the unload position Pu, an angle between the third edge 77 of the HGA 36U and the third edge 77 of the HGA 36L is smaller than an angle between the second edge 76 of the HGA 36U and the second edge 76 of the HGA 36L. The third edge 77 of the HGA 36U and the third edge 77 of the HGA 36L may be inclined with respect to each other.

At the unload position Pu, the edge 63b of the lift tab 63 of the HGA 36U and the edge 63b of the lift tab 63 of the HGA 36L are also arranged substantially parallel to each other. The edge 63b of the lift tab 63 of the HGA 36U and the edge 63b of the lift tab 63 of the HGA 36L may be inclined with respect to each other.

Since the lift tabs 63 and the third edges 77 of the HGAs 36U and 36L are arranged substantially in parallel at the unload position Pu, a certain interval (margin) is provided between the HGA 36U and the HGA 36L. For example, a distance between the two third edges 77 is set to 60 μm or more. Therefore, the HGAs 36U and 36L can be prevented from interfering with each other.

On the other hand, a width of the side rail 65 (a distance between the lower edge 71 and the upper edge 72) decreases due to the formation of the third edge 77. The decreased width may reduce a rigidity of the load beam 52 including the side rail 65 and reduce a strength and resonance characteristic of the HGA 36 against an impact. However, the third edge 77 is provided in the vicinity of the slider 54 and the lift tab 63. In other words, the width of the side rail 65 is decreased at the position where the HGAs 36U and 36L are closest to each other. However, other portion of the side rail 65 has a large width. Therefore, the HGA 36 can suppress a decrease in the rigidity of the load beam 52.

For example, a relatively heavy slider 54 and MA 55 in the HGA 36 are supported by the load beam 52 in the vicinity of the lift tab 63. The slider 54 and the MA 55 apply a load, like a cantilever, to a tip of the load beam 52 supported by the base plate 51.

The side rail 65 has a predetermined width between the periphery of the slider 54 and the MA 55 and the periphery of the base plate 51 supporting the load beam 52. Therefore, the HGA 36 can suppress the load beam 52 from being unexpectedly deformed by loads of the slider 54 and the MA 55.

On the other hand, between the lift tab 63 and the protrusion 64, the loads of the slider 54 and the MA 55 is less likely to act strongly on the load beam 52. Therefore, the formation of the third edge 77 is less likely to reduce the strength of the load beam 52 against the loads of the slider 54 and the MA 55.

In the present embodiment, the corners 78 of the two load beams 52 are closest to each other in the HGAs 36U and 36L. The load beam 52 can expand a distance between the HGA 36U and the HGA 36L by providing the recess 79 at the corner 78. Therefore, the HGAs 36U and 36L can be prevented from interfering with each other.

For example, the load beam 52 may bend around the leaf spring 62, due to an impact, such that the HGAs 36U and 36L approach each other. However, the HGAs 36U and 36L are provided with the inclined edges 76b at positions spaced apart from the lift tabs 63. Therefore, the HGAs 36U and 36L can maintain the distance therebetween, and can suppress mutual interference. The inclination of the inclined edge 76b is smaller than the inclination of the third edge 77. Therefore, the formation of the inclined edge 76b can suppress a decrease in the rigidity of the load beam 52 as compared with an extension of the third edge 77.

In the HDD 10 according to the first embodiment described above, each of the plurality of HGAs 36 includes the slider 54 configured to read and write information from and to one of the plurality of magnetic disks 12, and the load beam 52 supporting the slider 54. The HGAs 36 are movable between the load position Pl where the slider 54 is disposed on one of the plurality of magnetic disks 12 and the unload position Pu where the load beam 52 is supported by the ramp load mechanism 16. The load beam 52 has two side rails 65, the plate 61, the first plane 61a of the plate 61, the lift tab 63, the second plane 61b of the plate 61, and the protrusion 64. The plate 61 is provided between the two side rails 65. The first plane 61a is configured to face one of the plurality of magnetic disks 12 while the HGAs 36 are located at the load position Pl. The lift tab 63 protrudes from the end of the plate 61 in the forward direction Df along the first plane 61a. The lift tab 63 is configured to be supported by the ramp load mechanism 16 while the HGAs 36 are located at the unload position Pu. The second plane 61b is connected to an end of the first plane 61a in the backward direction Db opposite to the forward direction Df and is inclined with respect to the first plane 61a. The protrusion 64 protrudes from the first plane 61a and supports the slider 54. The lower edge 71 that is an edge of the two side rails 65 in the downward direction Dd in which the first plane 61a faces is connected to the plate 61. The upper edge 72 that is a respective edge of the two side rails 65 in the upward direction Du opposite to the downward direction Dd has the first edge 75, the second edge 76, and the third edge 77. The first edge 75 is farther from the lift tab 63 than the first plane 61a. The second edge 76 extends from the first edge 75 toward the lift tab 63. The third edge 77 extends from the second edge 76 to the lift tab 63 while being inclined with respect to the first plane 61a so as to approach the first plane 61a. The second edge 76 extends to the third edge 77 while being parallel with the first plane 61a or inclined with respect to the first plane 61a so as to approach the first plane 61a. In the backward direction Db, the end 54a of the slider 54 is at the same position as the end 77a of the third edge 77, or farther from the lift tab 63 than the end 77a of the third edge 77.

The side rail 65 of one HGA 36U and the side rail 65 of another adjacent HGA 36L extend so as to approach each other. In addition, when the lift tabs 63 are supported by the ramp load mechanism 16 at the unload position Pu, the load beam 52 is inclined such that the lift tabs 63 of the two HGAs 36U and 36L approach each other. However, the side rail 65 is provided with the third edge 77 connected to the lift tab 63 and inclined to approach the first plane 61a. As a result, in the vicinity of the lift tab 63, the third edge 77 of one HGA 36U and the third edge 77 of another adjacent HGA 36L can be made approximately parallel. Therefore, the HDD 10 of the present embodiment can suppress interference between the two HGAs 36U and 36L at the time of unloading. The third edge 77 is located closer to the lift tab 63 than the end 54a of the slider 54. In other words, a length of the third edge 77 is restrictively set. In addition, the second edge 76 does not extend while being inclined with respect to the first plane 61a so as to approach the first plane 61a from the third edge 77. In other words, the width of the side rail 65 does not decrease toward the base plate 51 that supports the load beam 52. Therefore, the HDD 10 of the present embodiment can suppress a decrease in the rigidity of the load beam 52.

The edge 63b of the lift tab 63 in the upward direction Du is continuous with the third edge 77. In other words, the third edge 77 does not protrude beyond the edge 63b of the lift tab 63 in the upward direction Du toward another HGA 36. Therefore, the HDD 10 of the present embodiment can suppress interference between the two HGAs 36U and 36L at the time of unloading. In addition, the third edge 77 is not recessed from the edge 63b of the lift tab 63 in the upward direction Du. Therefore, the HDD 10 of the present embodiment can suppress a decrease in rigidity of the load beam 52.

The second edge 76 is inclined with respect to the third edge 77. The angle between the second edge 76 and the first plane 61a is smaller than the angle between the third edge 77 and the first plane 61a. In other words, the second edge 76 is inclined so as to approach the first plane 61a more gradually than the third edge 77 in the vicinity of the lift tab 63. As a result, the HDD 10 of the present embodiment can suppress a decrease in the rigidity of the load beam 52.

The plurality of HGAs 36 include an HGA 36U and an HGA 36L adjacent to the HGA 36U. At the unload position Pu, the angle between the third edge 77 of the HGA 36U and the third edge 77 of the HGA 36L is smaller than the angle between the second edge 76 of the HGA 36U and the second edge 76 of the HGA 36L. In other words, the third edge 77 of the HGA 36U and the third edge 77 of the HGA 36L may be approximately parallel. Therefore, the HDD 10 of the present embodiment can suppress interference between the two HGAs 36U and 36L at the time of unloading.

The second edge 76 has the inclined edge 76b. The inclined edge 76b is inclined with respect to the first plane 61a so as to approach the first plane 61a and extends to the third edge 77. The angle between the first plane 61a and the inclined edge 76b is smaller than the angle between the first plane 61a and the third edge 77. In other words, even at a position farther from the lift tab 63 than the third edge 77, the inclined edge 76b of one HGA 36U and the inclined edge 76b of another adjacent HGA 36L can be made approximately parallel. Therefore, the HDD 10 according to the present embodiment can suppress interference between the two HGAs 36U and 36L even when, for example, an impact acts on the HGAs 36 at the time of unloading.

In the backward direction Db, the end 64a of the protrusion 64 is at the same position as the end 77a of the third edge 77, or is farther from the lift tab 63 than the end 77a of the third edge 77. In other words, the third edge 77 is positioned closer to the lift tab 63 than the end 64a of the protrusion 64 and is shortened. Therefore, the HDD 10 of the present embodiment can suppress a decrease in the rigidity of the load beam 52.

The recess 79 is provided at the end of the third edge 77 in the upward direction Du. In other words, the recess 79 is provided in a portion closest to another adjacent HGA 36L in the third edge 77 of one HGA 36U. As a result, the HDD 10 of the present embodiment can suppress interference between the two HGAs 36U and 36L at the time of unloading.

Each of the two side rails 65 has the side surface 73 provided between the upper edge 72 and the plate 61. The recess 79 is provided at the corner 78 between the third edge 77 and the side surface 73. For example, before the load beam 52 is pressed or bent, the side surface 73 is partially cut by, for example, partial etching, whereby the recess 79 is provided at the corner 78. Therefore, the HDD 10 of the present embodiment can easily provide the recess 79.

The first edge 75 and the second edge 76 are directly connected to the side surface 73. In other words, the recess 79 is not provided at a corner between the first edge 75 and the side surface 73, nor at a corner between the second edge 76 and the side surface 73. As a result, the HDD 10 of the present embodiment can suppress a decrease in the rigidity of the load beam 52 due to the provision of the recess 79.

Second Embodiment

Hereinafter, a second embodiment will be described with reference to FIG. 7. In the following description of the embodiment, components having functions similar to those of the components already described are denoted by the same reference signs as those of the components already described, and the description thereof may be omitted. In addition, a plurality of components denoted by the same reference sign does not necessarily have all the functions and properties in common, and may have different functions and properties according to each embodiment.

Figure 7:
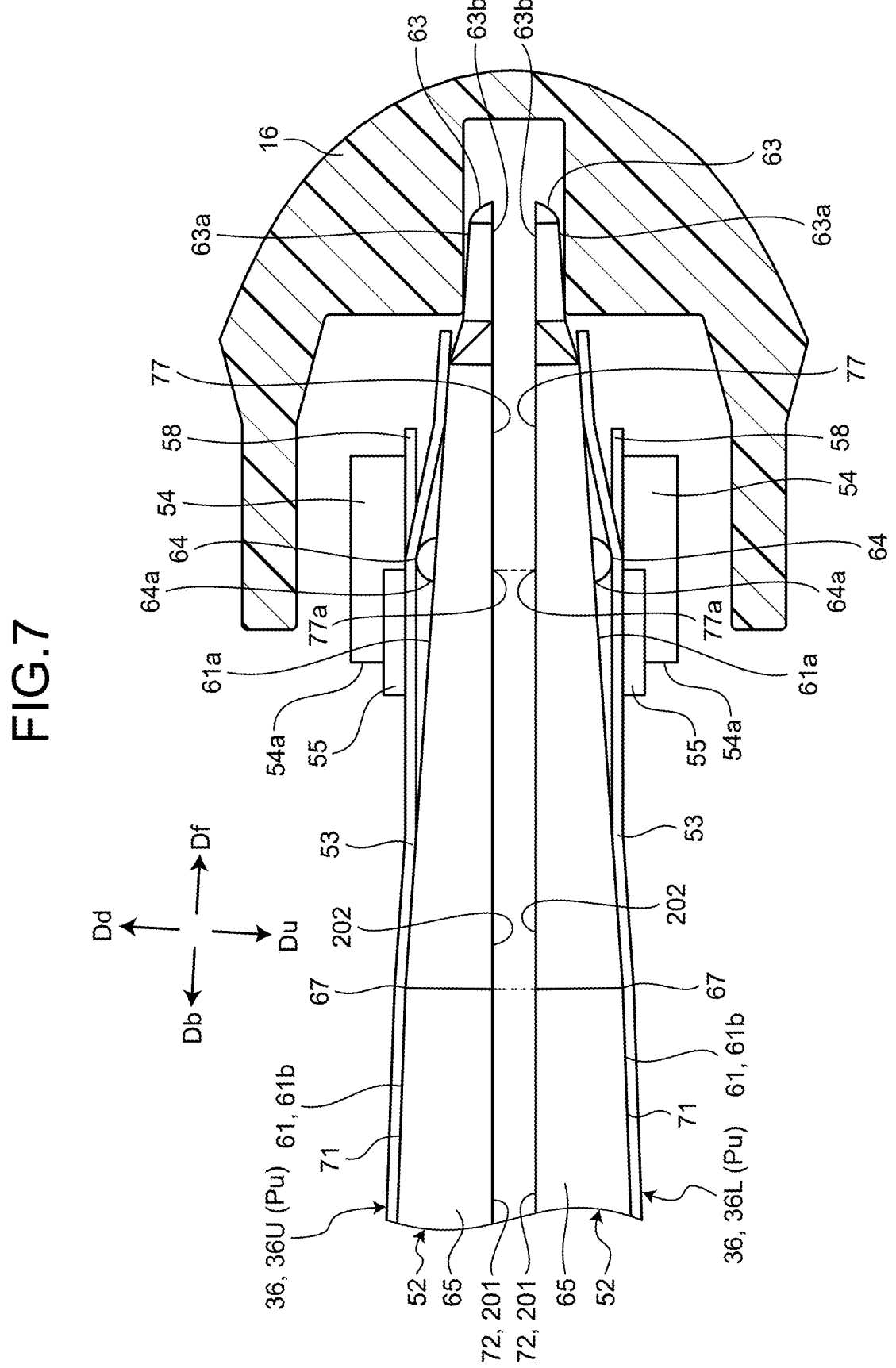
FIG. 7 is an exemplary side view illustrating a ramp load mechanism and an HGA at an unload position according to a second embodiment.

FIG. 7 is an exemplary side view illustrating the ramp load mechanism 16 and the HGA 36 at the unload position Pu according to the second embodiment. As illustrated in FIG. 7, the upper edge 72 of the second embodiment has a first edge 201 and a second edge 202 instead of the first edge 75 and the second edge 76. The first edge 201 and the second edge 202 are substantially equal to the first edge 75 and the second edge 76, except for a point described below.

In the second embodiment, the first edge 201, the second edge 202, and the third edge 77 of the side rail 65 and the edge 63b of the lift tab 63 are continuous with each other. In other words, the first edge 201, the second edge 202, the third edge 77, and the edge 63b of the lift tab 63 are disposed on the same plane. Note that the first edge 201, the second edge 202, the third edge 77, and the edge 63b of the lift tab 63 are not limited to this example.

The first edge 201 extends from the vicinity of the base plate 51 to the second edge 202 while being inclined with respect to the second plane 61b so as to approach the second plane 61b. In other words, a distance between the lower edge 71 and the first edge 201 decreases toward the forward direction Df. Note that the first edge 201 is not limited to this example.

The second edge 202 extends from the first edge 201 to the third edge 77 while being inclined with respect to the first plane 61a so as to approach the first plane 61a. In the second embodiment, an angle between the second edge 202 and the first plane 61a is equal to the angle between the third edge 77 and the first plane 61a. Note that the angle between the second edge 202 and the first plane 61a may be different from the angle between the third edge 77 and the first plane 61a.

At the unload position Pu, a distance between the first edge 201 of the HGA 36U and the first edge 201 of the HGA 36L is greater than or equal to a distance between the third edge 77 of the HGA 36U and the third edge 77 of the HGA 36L. Also, at the unload position Pu, a distance between the second edge 202 of the HGA 36U and the second edge 202 of the HGA 36L is greater than or equal to a distance between the third edge 77 of the HGA 36U and the third edge 77 of the HGA 36L.

In the HDD 10 of the second embodiment described above, the second edge 202 extends from the first edge 201 to the third edge 77 while being inclined with respect to the first plane 61a so as to approach the first plane 61a. In other words, the second edge 202 increases the width of the side rail 65 toward the base plate 51 as compared to being partially or entirely parallel to the first plane 61a. Therefore, the second edge 202 can compensate for the decrease in the width of the side rail 65 due to the formation of the third edge 77. Therefore, the HDD 10 of the present embodiment can suppress a decrease in the rigidity of the load beam 52.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A head gimbal assembly comprising:
a slider; and
a load beam including two side rails, a plate provided between the two side rails, a first plane of the plate, a lift tab protruding from an end of the plate in a first direction along the first plane, a second plane of the plate connected to an end of the first plane in a second direction opposite to the first direction and inclined with respect to the first plane, and a protrusion protruding from the first plane and supporting the slider, wherein
an edge of each of the two side rails in a third direction in which the first plane faces, is connected to the plate,
an edge of each of the two side rails in a fourth direction opposite to the third direction, has a first edge farther from the lift tab than the first plane, a second edge extending from the first edge toward the lift tab, and a third edge extending from the second edge to the lift tab while being inclined with respect to the first plane so as to approach the first plane,
the second edge extends to the third edge while being parallel to the first plane or inclined with respect to the first plane so as to approach the first plane, and
in the second direction, an end of the slider is at a same position as an end of the third edge or farther from the lift tab than the end of the third edge, and
the second edge is inclined with respect to the third edge, and an angle between the second edge and the first plane is smaller than an angle between the third edge and the first plane.

2. A disk device comprising:
a plurality of magnetic disks;
a ramp; and
a plurality of head gimbal assemblies each including a slider configured to read and write information from and to one of the plurality of magnetic disks, and a load beam supporting the slider, the plurality of head gimbal assemblies each being movable between a load position where the slider is located on the one of the plurality of magnetic disks, and an unload position where the load beam is supported by the ramp, wherein
the load beam includes two side rails, a plate provided between the two side rails, a first plane of the plate, a lift tab protruding from an end of the plate in a first direction along the first plane, a second plane of the plate connected to an end of the first plane in a second direction opposite to the first direction and inclined with respect to the first plane, and a protrusion protruding from the first plane and supporting the slider,
the first plane is configured to face the one of the plurality of magnetic disks while the plurality of head gimbal assemblies are located at the load position,
the lift tab is configured to be supported by the ramp while the plurality of head gimbal assemblies are located at the unload position,
an edge of each of the two side rails in a third direction in which the first plane faces, is connected to the plate,
an edge of each of the two side rails in a fourth direction opposite to the third direction, has a first edge farther from the lift tab than the first plane, a second edge extending from the first edge toward the lift tab, and a third edge extending from the second edge to the lift tab while being inclined with respect to the first plane so as to approach the first plane, the second edge extends to the third edge while being parallel to the first plane or inclined with respect to the first plane so as to approach the first plane, and in the second direction, an end of the slider is at a same position as an end of the third edge or farther from the lift tab than the end of the third edge, and the second edge is inclined with respect to the third edge, and an angle between the second edge and the first plane is smaller than an angle between the third edge and the first plane.

3. The disk device according to claim 2, wherein an edge of the lift tab in the fourth direction is continuous with the third edge.

4. The disk device according to claim 2, wherein the plurality of head gimbal assemblies include a first head gimbal assembly and a second head gimbal assembly adjacent to the first head gimbal assembly, while the plurality of head gimbal assemblies are positioned at the unload position, an angle between the third edge of the first head gimbal assembly and the third edge of the second head gimbal assembly is smaller than an angle between the second edge of the first head gimbal assembly and the second edge of the second head gimbal assembly.

5. The disk device according to claim 2, wherein the second edge has an inclined edge extending to the third edge while being inclined with respect to the first plane so as to approach the first plane, the angle between the inclined edge and the first plane being smaller than the angle between the third edge and the first plane.

6. The disk device according to claim 2, wherein in the second direction, an end of the protrusion is at a same position as the end of the third edge or farther from the lift tab than the end of the third edge.

7. The disk device according to claim 2, wherein an end of the third edge in the fourth direction is provided with a recess.

8. The disk device according to claim 7, wherein each of the two side rails has a side surface provided between the edge of a corresponding one of the two side rails in the fourth direction and the plate, and the recess is provided at a corner between the third edge and the side surface.

9. The disk device according to claim 8, wherein the first edge and the second edge are directly connected to the side surface.

* * * * *